3,272,809
CONVERSION OF 7-CARBOXYLIC ACYLAMINO-CEPHALOSPORANIC ACID COMPOUNDS TO 7-ACA

Stephen Eardley, Ruislip, Middlesex, and Alan Gibson Long, Greenford, Middlesex, England, assignors to Glaxo Laboratories Limited, Greenford, England, a British company
No Drawing. Filed Nov. 22, 1963, Ser. No. 325,741
Claims priority, application Great Britain, Nov. 23, 1962, 44,449/62
3 Claims. (Cl. 260—243)

This invention is concerned with the conversion of 7-acylaminocephalosporanic acid compounds to 7-aminocephalosporanic acid.

Various methods have hitherto been proposed for the preparation of 7-aminocephalosporanic acid from corresponding 7-acyloaminocephalosporanic acids including the use of conventional hydrolytic agents and enzymes.

We have now found that is possible to effect this conversion by means of a reagent which generates carbonium ions in situ in a solvent medium, the method having the advantage that it is not dependent on the nature of the acyl group attached to the 7-amino group.

According to the invention, therefore, there is provided a process for the preparation of 7-aminocephalosporanic acid which comprises reacting a 7-acylaminocephalosporanic acid with a reagent which generates carbonium ions in situ in a solvent medium.

The 7-acylaminocephalosporanic acid may be cephalosporin C or it may be another 7-acylaminocephalosporanic acid compound such as, for example, 7-phenylacetamidocephalosporanic, acid or 7-(N'-2',4'-dinitrophenyladipamido) cephalosporanic acid.

One may use for example, as the carbonium ion generator boron trifluoride, etherate, a lower alkanol e.g. ethanol and a lower alkyl orthoformate e.g. ethyl orthoformate.

The reaction will generally be conducted in solution in a solvent in which the 7-acylaminocephalosporanic acid compound is at least partially soluble and which may or may not be inert depending on the reagent used. Suitable solvents include ethers e.g. diethyl ether, tetrahydrofuran and dioxan; nitrohydrocarbons e.g. nitrobenzene and halogenated hydrocarbons e.g. methylene chloride.

It is generally convenient to effect the reaction at room temperature but temperatures ranging from 0 to 40° C. may be used if desired. The 7-aminocephalosporanic acid may be recovered from the reaction medium by solvent extraction or filtration. The success of the decomposition can be judged by paper chromatography and electrophoresis. 7-aminocephalosporanic acid is recognised by its giving a yellow spot with ninhydrin.

In order that the invention may be well understood, the following examples are given by way of illustration only.

Example 1

7-phenylacetamidocephalosporanic acid (100 mg.) was dissolved in dioxan (2.7 ml.), ethyl orthoformate (0.54 ml., 3 equiv.) and absolute alcohol (0.05 ml.). Boron trifluoride etherate (0.16 ml., 5 equiv.) was added and the mixture stirred at room temperature. Samples withdrawn for paper electrophoretic examination showed that 7-aminocephalosporanic acid was present after 20 min. and after 24 hr.

In the absence of absolute alcohol detectable amounts of 7-aminocephalosporanic acid were not formed.

Example 2

Cephalosporin C (free acid) (100 mg.) was dissolved in a mixture of dioxan (2.7 ml.), boron trifluoride etherate (0.08 ml.), absolute alcohol (dried with magnesium) (0.05 ml.) and ethyl orthoformate (0.54 ml.). The mixture was stirred at room temperature and examined by paper electrophoresis at pH 1.9. 7-aminocephalosporanic acid was shown to be present in a reaction lasting up to 4 days.

We claim:
1. In a process for the preparation of 7-aminocephalosporanic acid from 7-carboxylic acylaminocephalosporanic acid, the step which comprises reacting 7-carboxylic acylaminocephalosporanic acid in a solvent medium with boron trifluoride etherate, ethanol and ethyl orthoformate acting in combination as a source of carbonium ions.

2. In a process for the preparation of 7-aminocephalosporanic acid from 7-phenylacetamidocephalosporanic acid, the step which comprises reacting 7-phenylacetamidocephalosporanic acid in a solvent medium with boron trifluoride etherate, ethanol and ethyl orthoformate acting in combination as a source of carbonium ions.

3. In a process for the preparation of 7-aminocephalosporanic acid from cephalosporin C, the step which comprises reacting cephalosporin C in a solvent medium with boron trifluoride etherate, ethanol and ethyl orthoformate acting in combination as a source of carbonium ions.

No references cited.

ALEX MAZEL, *Primary Examiner.*

HENRY R. JILES, *Examiner.*

JAMES W. ADAMS, JR., *Assistant Examiner.*